(12) United States Patent
Kurosawa et al.

(10) Patent No.: US 7,978,272 B2
(45) Date of Patent: Jul. 12, 2011

(54) LIQUID CRYSTAL DISPLAY DEVICE COMPRISING A SURFACE OF THE PIXEL ELECTRODE ON AN INSULATING FILM IN THE AREA WHERE THE AUXILIARY CAPACITANCE IS FORMED IS UNEVEN

(75) Inventors: Yoshio Kurosawa, Mie (JP); Shuntaro Kosugi, Yonago (JP)

(73) Assignee: Sharp Kabushiki Kaisha, Osaka (JP)

( * ) Notice: Subject to any disclaimer, the term of this patent is extended or adjusted under 35 U.S.C. 154(b) by 321 days.

(21) Appl. No.: 11/439,449

(22) Filed: May 24, 2006

(65) Prior Publication Data

US 2007/0040977 A1 Feb. 22, 2007

(30) Foreign Application Priority Data

May 24, 2005 (JP) .................................. 2005-151573

(51) Int. Cl.
*G02F 1/1343* (2006.01)
*G02F 1/1333* (2006.01)

(52) U.S. Cl. ............................. 349/38; 349/39; 349/138

(58) Field of Classification Search ............. 349/38–39, 349/138
See application file for complete search history.

(56) References Cited

U.S. PATENT DOCUMENTS

| 5,126,865 | A | | 6/1992 | Sarma |
| 5,814,529 | A | * | 9/1998 | Zhang .............................. 438/30 |
| 5,815,226 | A | * | 9/1998 | Yamazaki et al. ............. 349/111 |
| 6,762,802 | B2 | | 7/2004 | Ono et al. |
| 6,940,566 | B1 | * | 9/2005 | Rho et al. ......................... 349/42 |
| 7,212,255 | B2 | * | 5/2007 | Chung .............................. 349/38 |
| 7,250,996 | B2 | * | 7/2007 | Yoshida et al. ................ 349/114 |
| 2004/0233343 | A1 | * | 11/2004 | Baek ................................ 349/38 |

FOREIGN PATENT DOCUMENTS

| EP | 0 493 798 A2 | 7/1992 |
| JP | 5-066412 | 3/1993 |
| JP | 2001-324725 | 11/2001 |

* cited by examiner

*Primary Examiner* — Mark A Robinson
*Assistant Examiner* — Charles Chang
(74) *Attorney, Agent, or Firm* — Nixon & Vanderhye P.C.

(57) ABSTRACT

The invention relates to an active matrix liquid crystal display device which uses a switching device to control a pixel, and an object is to provide a liquid crystal display device which has an excellent viewing angle property and high brightness and a fabrication method of the same. A TFT substrate has a structure which reduces the film thickness of a protective insulating film in a control capacitance part in which control capacitance is formed and the film thickness of a protective insulating film in an auxiliary capacitance part in which auxiliary capacitance is formed thinner than the film thickness of a protective insulating film which covers a TFT and the other elements.

3 Claims, 16 Drawing Sheets

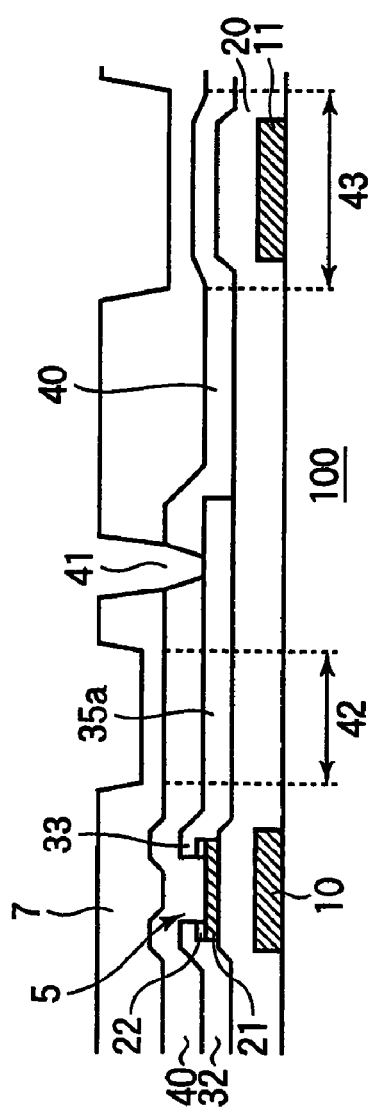

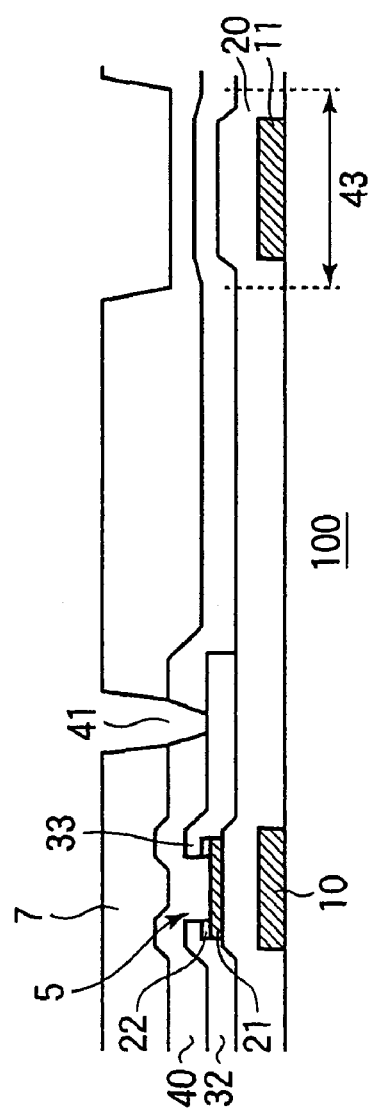
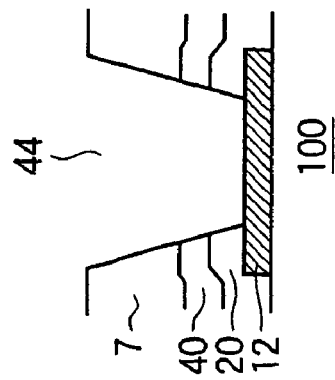

LIQUID CRYSTAL DISPLAY DEVICE COMPRISING A SURFACE OF THE PIXEL ELECTRODE ON AN INSULATING FILM IN THE AREA WHERE THE AUXILIARY CAPACITANCE IS FORMED IS UNEVEN

BACKGROUND OF THE INVENTION

1. Field of the Invention

The present invention relates to an active matrix liquid crystal display device which uses a switching device to control pixels.

2. Description of the Related Art

A liquid crystal display device generally widely available is in TN liquid crystal mode. A TN liquid crystal display device has a disadvantage that its viewing angle property is not better than that of a CRT. Liquid crystal display devices in IPS (In-Plane Switching) mode and MVA (Multi-domain Vertical Alignment) mode having an improved viewing angle property are developed, and are widely used as a display unit for electronic devices. In these devices, in an MVA liquid crystal display device, a protrusion in a bank shape or a recess in a slit shape is disposed in a pixel on at least one of a TFT substrate on which a switching device (TFT) is formed to control a liquid crystal pixel or a common substrate on which a color filter is formed. The protrusion or the recess controls the alignment of liquid crystal molecules. In the MVA liquid crystal display device, the alignment is split (multi-domain) by utilizing its property that the tilt directions of the liquid crystal molecules are varied on both sides of the protrusion (or the recess), and thus a wide viewing angle property can be implemented.

In the MVA liquid crystal display device before, a phenomenon occurs in which a screen looks whitish when it is viewed from an oblique direction. FIG. 15 shows a T-V (transmittance to voltage) property when a screen is viewed from the front side (a curve connecting solid diamonds), and a T-V property when the screen is viewed from the direction at an angle of 60 degrees upward with respect to the front side (a curve connecting asterisks) where the horizontal axis is the applied voltage (V), and the vertical axis is the transmittance. As shown in the area circled in FIG. 15, the transmittance viewed from the oblique direction is higher than the transmittance viewed from the front side when voltage slightly higher than a threshold voltage is applied to a pixel electrode. In addition, when the applied voltage becomes higher to some extent, the transmittance viewed from the oblique direction is lower than the transmittance viewed from the front side. On this account, when the screen is viewed from the oblique direction, the brightness difference in a red pixel, a green pixel and a blue pixel becomes small. Consequently, as described above the phenomenon occurs that the screen looks whitish. This phenomenon is called discolor. Discolor occurs in the MVA liquid crystal display device as well as in the TN liquid crystal display device.

For a scheme to solve this phenomenon, there is a method in which a pixel electrode is split into two areas, a switching device is connected to the pixel electrode in one of the areas to directly apply data voltage (data signal), and data voltage is applied to the pixel electrode in the other area through capacitance. In the pixel area to which data voltage is applied through capacitance, the capacitance ratio to the liquid crystal capacitance determines the voltage to be applied to liquid crystals, and this voltage is different from the voltage to be applied to the pixel area to which data voltage is directly applied. Thus, the phenomenon shown in FIG. 15 is suppressed that the transmittance viewed from the oblique direction is higher than the transmittance viewed from the front side, and consequently, the phenomenon is also suppressed that the screen looks whitish (discolor). As described above, the method in which a single pixel is split into a plurality of areas and the pixel areas capacitively coupled are used to improve the display property is called a half tone gray scale method by capacitive coupling (capacitive coupling HT method).

FIGS. 16A and 16B show the configuration of a single pixel of a TFT substrate of a conventional MVA liquid crystal display device before using the capacitive coupling HT method. FIG. 16A shows a plan layout depicting a single pixel. FIG. 16B shows a cross section sectioned at a phantom line A-A' shown in FIG. 16A. Although not shown in the drawing, the MVA liquid crystal display device actually has the structure in which vertical alignment liquid crystals are sealed and sandwiched between a TFT substrate 101 and a common substrate (not shown) on which a color filter and other elements are laminated. For the sake of easy understanding, protrusions 61, 62 and 63 in a bank shape are additionally shown in FIG. 16A. The protrusions are formed on the common substrate side to control the alignment of liquid crystal molecules. In the liquid crystal display device, a multi-domain is formed of the protrusions 61, 62 and 63 and a recess that is formed of a space having a slope at an angle of 45 degrees between pixel electrodes 51 and 52 on the TFT substrate 101 side.

As shown in FIGS. 16A and 16B, on a glass substrate 100, a gate bus line 10 and an auxiliary capacitance bus line 11 are arranged in parallel with each other, which are formed of Ti, for example. An insulating film 20 formed of SiN is formed over throughout the front surface thereon. The gate bus line 10 is partially used as a gate electrode of a TFT 5 which switches a liquid crystal pixel. In the area of the TFT 5, an operative semiconductor layer 21 is formed which is made of amorphous silicon, and an impurity layer 22 is formed which is made of amorphous silicon doped with phosphorus. The insulating film 20 on the gate electrode functions as a gate insulating film. The following are formed of materials such as Al: a data bus line 31 which is orthogonal to the gate bus line 10 through the insulating film 20, a drain electrode 32 which is connected to the data bus line 31, a source electrode 33 which is disposed on the operative semiconductor layer 21 and faces the drain electrode 32 at a predetermined space, and control electrodes 35a, 35b and 35c which are connected to the source electrode 33. A protective insulating film 40 which is made of SiN is formed over throughout the front surface thereof.

A contact hole 41 is opened in the protective insulating film 40, and the control electrode 35a is electrically connected to the pixel electrode 51 in a first area and formed thereabove through the contact hole 41. In addition, the protective insulating film 40 is opened in terminal lead parts of the gate bus line 10, the auxiliary capacitance bus line 11 and the data bus line 31 outside a display area, not shown. In the gate bus line 10 and the auxiliary capacitance bus line 11, the insulating film 20 is also opened. The pixel electrodes 51 and 52 are formed of a transparent electrode such as ITO. The pixel electrode 52 is in a second area and separated from the pixel electrode 51 in the first area. The pixel electrode 52 is capacitively coupled to the control electrodes 35a, 35b and 35c through the protective insulating film 40. Thus, the capacitive coupling HT method is implemented, and discolor can be suppressed in the liquid crystal display device when viewed from the oblique direction. In addition, auxiliary capacitance is formed by the auxiliary capacitance bus line 11, the pixel electrodes 51 and 52 as well as the insulating film 20 and the protective insulating film 40 which are sandwiched therebetween.

Patent Reference: JP-Application-No. 2004-106138

In the capacitive coupling HT method, the control electrodes 35*b* and 35*c* are particularly required which are capacitively coupled to the pixel electrode 52 in the second area. The control electrodes 35*b* and 35*c* are formed at the same time when the data bus line 31, the drain electrode 32 and the source electrode 33 are fabricated in order not to increase the number of fabrication process steps, and they need an area to some extent to provide required control capacitance. The data bus line 31 is demanded to have a low resistance value to some extent because of a problem of a time constant when data voltage is written to a pixel, and thus metal such as Al is used for the data bus line 31. Therefore, for a transmissive liquid crystal display device, the control electrodes 35*b* and 35*c* overlapped with the pixel electrode 52 in the second area are the areas that light is not transmitted. On this account, a problem arises that the aperture ratio of the pixel is reduced and the brightness of a display device is dropped.

The liquid crystal display device needs auxiliary capacitance regardless of the use of the capacitive coupling HT method. Generally, the liquid crystals are driven at alternate current. However, a shift occurs in the effective voltage that is applied to liquid crystals depending on the cases in which a pixel is written at a positive voltage and it is written at a negative voltage. In order to relax the shift in the effective voltage and to prevent a phenomenon of image sticking or flickering in a display screen, auxiliary capacitance is provided in each pixel in the magnitude that is one to several times the liquid crystal capacitance. As shown in FIGS. 16A and 16B, auxiliary capacitance is formed at the area where the auxiliary capacitance bus line 11, the pixel electrodes 51 and 52 are overlapped with each other. In order to obtain a predetermined capacitance value, the area of the overlapping part is needed to some extent, and it is required to thicken the auxiliary capacitance bus line 11 and other schemes. Consequently, the auxiliary capacitance bus line 11 formed of metal such as Ti causes a reduction in the aperture ratio of the pixel.

SUMMARY OF THE INVENTION

An object of the invention is to provide a liquid crystal display device which has an excellent viewing angle property and high brightness, and the fabrication method of the same.

The object is achieved by a liquid crystal display device including: first and second substrates which are disposed as they face each other; vertical alignment type liquid crystals which are sealed between the first and the second substrates; a plurality of gate bus lines which are disposed on the first substrate and to which a scanning signal is supplied; a plurality of data bus lines which are disposed on the first substrate as they intersects with the gate bus lines and to which a display signal is supplied; a switching device which is formed in every pixel area, the area being defined by the gate bus lines and the data bus lines; a pixel electrode which is formed at each of the pixel areas; a control electrode which is disposed in the pixel area and connected to the switching device; and a protective insulating film which is disposed below the pixel electrodes and which covers the gate bus lines, the data bus lines, the switching devices and the control electrodes, wherein the pixel electrode is split into at least first and second areas, the pixel electrode in the first area is electrically connected to the control electrode, and the pixel electrode in the second area is capacitively coupled through the control electrode and the protective insulating film, wherein at least one part of the protective insulating film sandwiched between the pixel electrode in the second area and the control electrode is formed to have a film thickness thinner than that of the protective insulating film which covers other portions.

In the liquid crystal display device according to the invention, the protective insulating film which covers the gate bus lines, the data bus lines, and the switching devices is formed of at least first and second layers from below, and at least one part of the protective insulating film sandwiched between the pixel electrode in the second area and the control electrode is formed of only the first layer.

In addition, the object is achieved by a liquid crystal display device including: first and second substrates which are disposed as they face each other; liquid crystals which are sealed between the first and the second substrates; a plurality of gate bus lines which are disposed on the first substrate and to which a scanning signal is supplied; a plurality of auxiliary capacitance electrodes which are formed at the same time to form the gate bus lines; an insulating film which is formed above the gate bus lines and the auxiliary capacitance electrodes and one part of which functions as a gate insulating film; a data bus line which is disposed on the first substrate as it intersects with the gate bus line and to which a display signal is supplied; a switching device which is formed in every pixel area, the area being defined by the gate bus lines and the data bus lines; a pixel electrode which is electrically connected to the switching device; a protective insulating film which is disposed below the pixel electrode and which covers the gate bus lines, the data bus lines and the switching devices; and an auxiliary capacitance which is formed between the pixel electrode and the auxiliary capacitance electrode, wherein the protective insulating film above the auxiliary capacitance electrode is removed, the insulating film which is sandwiched between the auxiliary capacitance electrode and the pixel electrode forms the auxiliary capacitance, and the insulating film which forms the auxiliary capacitance is formed to have a film thickness the same as that of the insulating film in the switching device or thinner.

In the liquid crystal display device according to the invention, the protective insulating film which covers the gate bus lines, the data bus lines and the switching devices is formed of at least first and second layers from below.

In addition, the object is achieved by a liquid crystal display device including: first and second substrates which are disposed as they face each other; liquid crystals which are sealed between the first and the second substrates; a plurality of gate bus lines which are disposed on the first substrate and to which a scanning signal is supplied; a plurality of auxiliary capacitance electrodes which are formed at the same time to form the gate bus lines; an insulating film which is formed above the gate bus lines and the auxiliary capacitance electrodes and one part of which functions as a gate insulating film; a plurality of data bus lines which are disposed on the first substrate as they intersects with the gate bus lines and to which a display signal is supplied; a switching device which is formed in every pixel area, the area being defined by the gate bus lines and the data bus lines; a pixel electrode which is electrically connected to the switching device; a protective insulating film which is disposed below the pixel electrodes and which covers the gate bus lines, the data bus lines and the switching devices; and an auxiliary capacitance which is formed between the pixel electrode and the auxiliary capacitance electrode, wherein the protective insulating film which covers the switching device is formed of at least first and second layers from below and the second layer is removed in the protective insulating film above the auxiliary capacitance electrode, and the auxiliary capacitance is formed of the insulating film and the first layer of the protective insulating film.

In addition, the object is achieved by a fabrication method of a liquid crystal display device including the steps of: forming a gate bus line, a data bus line, a switching device and a control electrode on a first substrate and then forming a protective insulating film over throughout a front surface of the first substrate; coating a photoresist over throughout the front surface of the protective insulating film, removing the photoresist in a portion which electrically connects the control electrode to a pixel electrode in a first area, and exposing and developing the photoresist so that a film thickness of the photoresist on the protective insulating film sandwiched between the control electrode and a pixel electrode in a second area is thinner than that of the photoresist to remain in other portions; etching the protective insulating film in the portion which electrically connects the control electrode to the pixel electrode in the first area and uncovering the control electrode; removing the photoresist formed thin on the protective insulating film sandwiched between the control electrode and the pixel electrode in the second area and leaving the photoresist on the protective insulating film in other portions; etching one part of a film thickness of the protective insulating film sandwiched between the control electrode and the pixel electrode in the second area and reducing the film thickness of the protective insulating film; removing all of the photoresist; and forming the pixel electrodes in the first and the second areas on the protective insulating film.

In addition, the object is achieved by a fabrication method of a liquid crystal display device including the steps of: forming a gate bus line, an auxiliary capacitance electrode, an insulating film one part of which functions as a gate insulating film, a data bus line, and a switching device on a first substrate and then forming a protective insulating film over throughout a front surface of the first substrate; coating a photoresist over throughout the front surface of the protective insulating film, removing the photoresist in a terminal lead part of the gate bus line, and exposing and developing the photoresist so that a film thickness of the photoresist on the protective insulating film in a portion which electrically connects the switching device to a pixel electrode and in a portion in which an auxiliary capacitance is formed is thinner than that of the photoresist to remain in other portions; etching the protective insulating film in a terminal lead part of the gate bus line and the insulating film; removing the photoresist formed thin on the protective insulating film in the portion which electrically connects the switching device to the pixel electrode and in the portion in which the auxiliary capacitance is formed and leaving the photoresist on the protective insulating film in other portions; etching all of the protective insulating film in the portion which electrically connects the switching device to the pixel electrode and the portion in which the auxiliary capacitance is formed; removing all the photoresist; and forming the pixel electrode on the protective insulating film and the insulating film.

According to the invention, a liquid crystals display device can be implemented which has an excellent viewing angle property and high brightness.

BRIEF DESCRIPTION OF THE DRAWINGS

The teachings of the invention can be readily understood by considering the following detailed description in conjunction with the accompanying drawings, in which:

FIGS. 3A and 3B show cross sectional diagrams depicting the fabrication process steps of the TFT substrate for use in the liquid crystal display device according to the first embodiment of the invention;

FIGS. 9A and 9B show cross sectional diagrams depicting the fabrication process steps of the TFT substrate for use in the liquid crystal display device according to the second embodiment of the invention;

DETAILED DESCRIPTION OF THE INVENTION

First Embodiment

Figure 1A:
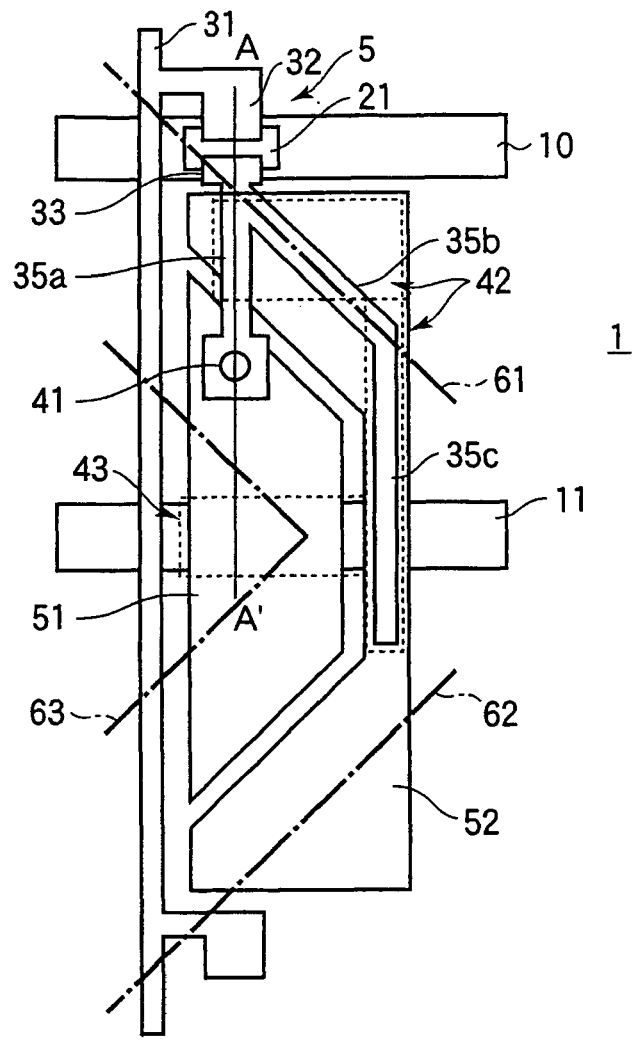
FIGS. 1A and 1B show diagrams depicting the schematic configuration of a single pixel of a TFT substrate for use in a liquid crystal display device according to a first embodiment of the invention.
Figure 1B:
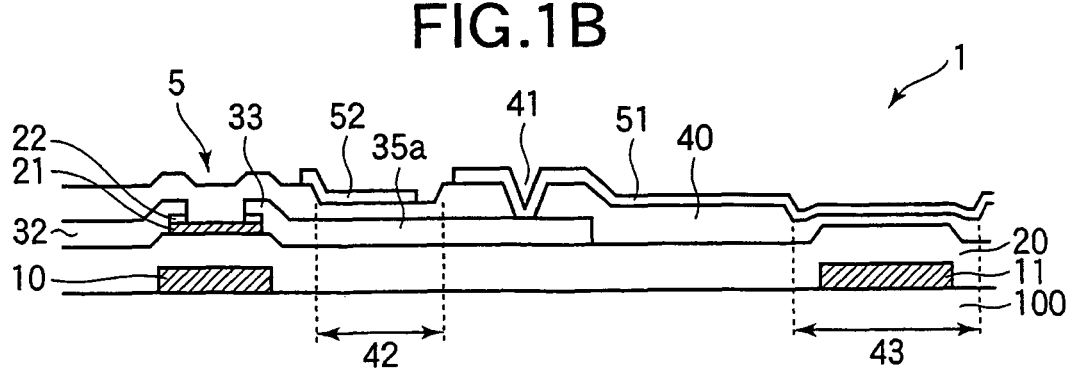

A liquid crystal display device according to a first embodiment of the invention and a fabrication method of the same will be described with reference to FIGS. 1A to 6C. First, the principle of the embodiment will be described with reference to FIGS. 1A and 1B and FIGS. 3A and 3B. FIGS. 1A and 1B show the configuration of a single pixel of a thin film transistor circuit board (TFT substrate) 1 for use in an MVA liquid crystals display device which is a liquid crystal display device according to the embodiment and uses the halftone gray scale method (capacitive coupling HT method) by capacitive coupling. FIG. 1A shows a plan layout depicting a single pixel of the TFT substrate 1, and FIG. 1B shows the configuration of a cross section sectioned at a phantom line A-A' shown in FIG. 1A. FIGS. 2A to 4B show cross sectional diagrams depicting the fabrication process steps of the TFT substrate 1 shown in FIGS. 1A and 1B. FIGS. 5A to 6C show cross sectional diagrams depicting the fabrication process steps of a TFT substrate for use in a liquid crystal display device of an exemplary modification according to the embodiment.

As shown in FIGS. 1A and 1B, control electrodes 35$a$, 35$b$ and 35$c$ are overlapped with a pixel electrode 52 in a second area. The film thickness of a protective insulating film 40 in a control capacitance part 42 in which control capacitance is formed is formed thinner than that of a protective insulating film 40 which covers a TFT (switching device) 5, a data bus line 31 and other elements. This structure is configured to allow control capacitance to have a required capacitance value with no increase in the area of the control electrodes 35$b$ and 35$c$.

Similarly, for an auxiliary capacitance part 43 which becomes auxiliary capacitance, the film thickness of the protective insulating film 40 is formed thinner than the film thickness of the protective insulating film 40 which covers the TFT 5, the data bus line 31 and other elements. Thus, auxiliary capacitance having a sufficient capacitance value can be obtained without thickening the auxiliary capacitance bus line 11. When the film thickness of the protective insulating film 40 which covers the TFT 5 and the other elements is formed as thin as that of the protective insulating films 40 in the control capacitance part 42 and the auxiliary capacitance part 43, it is insufficient to protect elements from damage during the fabrication of the liquid crystal display device and from external moisture. However, in the embodiment, the film thickness of the protective insulating film 40 is formed to have the optimum value both in the area intended for protection and the area intended for obtaining capacitance of a high capacitance value.

In addition, in order to vary the film thickness of the protective insulating film 40 depending on places, another mask is prepared separately from an etching mask for a contact hole 41 and the protective insulating film 40 in a terminal lead part outside the display area, the film thickness of the protective insulating films 40 in the control capacitance part 42 and the auxiliary capacitance part 43 is partially etched, and thus the TFT substrate 1 having the structure shown in FIG. 1B can be obtained. However, by this method, one step of photolithography process steps is added to cause an increase in fabrication cost.

Then, in the embodiment, as shown in FIGS. 3A and 3B, a resist mask 7 is formed as it is opened in the contact hole 41 and in an opening part in which a terminal part 44 is uncovered. However, it is formed to have a relatively thin film thickness in the control capacitance part 42 and the auxiliary capacitance part 43, as compared with the area in which the resist is left in the other areas. The resist mask 7 like this is used to first etch and open the contact hole 41 and the gate terminal lead part 44. Subsequently, the thin, remaining resist is removed by oxygen plasma, for example, and then the film thickness of the protective insulating films 40 in the control capacitance part 42 and the auxiliary capacitance part 43 is partially etched. Thus, the film thickness of the protective insulating films 40 in the control capacitance part 42 and the auxiliary capacitance part 43 can be varied from the film thickness of the protective insulating film 40 in the other areas.

The principle of an exemplary modification according to the embodiment will be described with reference to FIGS. 6A to 6C. As shown in FIG. 6C, in the exemplary modification, a protective insulating film 40 for a TFT 5 and the other elements is formed to have the structure of two layers or more in which an under layer film (first insulating layer) 401 which is formed of SiN, for example, is laminated with an upper layer film (second insulating layer) 402 which is formed of $SiO_2$, for example, and has an etching selection ratio with respect to the under layer film 401. In a control capacitance part 42 and an auxiliary capacitance part 43, the upper layer film 402 is removed to form a protective insulating film 40 which is formed of only the under layer film 401, and thus the film thickness can be formed relatively thin.

As described above, according to the embodiment, this structure can be configured in which the film thickness of the protective insulating films 40 in the control capacitance part 42 and the auxiliary capacitance part 43 is thinner than the film thickness of the protective insulating film 40 which covers the TFT 5 and the other elements. Therefore, the ratio of the areas in a single pixel occupied by control capacitance or auxiliary capacitance is made small while the protective function against damage during the wiring process for the TFT 5 is secured as well as the capacitance value of control capacitance or auxiliary capacitance formed on the TFT substrate 101 before is maintained. Accordingly, a reduction in the aperture ratio of a single pixel can be suppressed at a minimum, and a liquid crystal display device of high brightness can be obtained. Furthermore, since the capacitive coupling HT method can be adapted, an MVA liquid crystal display device of an excellent viewing angle property with no discolor can be obtained.

EXAMPLE 1-1

A liquid crystal display device of Example 1-1 according to the embodiment and a fabrication method of the same will be described with reference to FIGS. 1A to 4B. The MVA liquid crystal display device using the capacitive coupling HT method shown in FIGS. 1A and 1B actually has the structure in which vertical alignment liquid crystals are sandwiched between the TFT substrate 1 and a common substrate (not shown) on which a color filter and the other elements are laminated. For the sake of easy understanding, in FIG. 1A, protrusions 61, 62 and 63 in a bank shape are additionally shown which are formed on the common substrate side and control the alignment of liquid crystal molecules. In the liquid crystal display device, a multi-domain is formed by the protrusions 61, 62 and 63 and a recess that is formed of a space having a slope at an angle of 45 degrees between the pixel electrode 51 in the first area and the pixel electrode 52 in the second area on the TFT substrate 1 side.

Figure 2A:
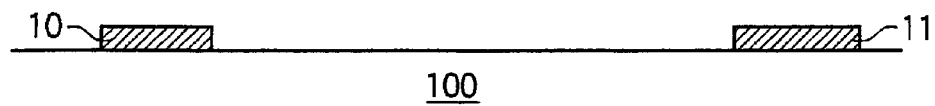
FIGS. 2A to 2D show cross sectional diagrams depicting the fabrication process steps of the TFT substrate for use in the liquid crystal display device according to the first embodiment of the invention.

Next, the fabrication method of the liquid crystal display device according to the embodiment will be described with reference to FIGS. 2A to 4B. As shown in FIG. 2A, on a glass substrate (the first substrate) 100, Al is deposited in a film thickness of 150 nm, for example, Ti is deposited in a film thickness of 50 nm, for example, in this order, and they are patterned to form a gate bus line 10 and an auxiliary capacitance bus line 11. In a cross section shown in the drawing, the gate bus line 10 functions as a gate electrode, and the auxiliary capacitance bus line 11 functions as an auxiliary capacitance electrode.

Figure 2B:
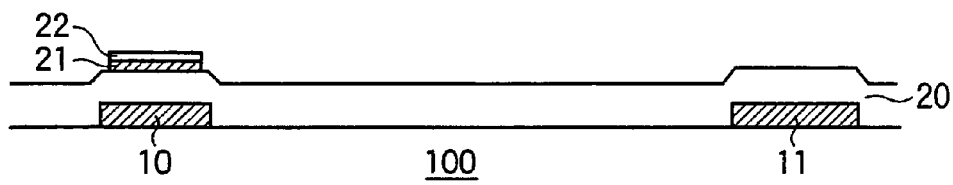

Subsequently, as shown in FIG. 2B, an insulating film 20 formed of SiN having a film thickness of 400 nm, for example, is formed over throughout the front surface. In a cross section shown in the drawing, the insulating film 20 on the gate bus line 10 functions as a gate insulating film. Then, amorphous silicon is deposited in a film thickness of 70 nm, for example, amorphous silicon doped with phosphorus is deposited in a film thickness of 50 nm, for example, in this order, and they are patterned to form an operative semiconductor layer 21 and an impurity layer 22. The operative semiconductor layer 21 and the impurity layer 22 are formed in the area in which a TFT is formed.

Figure 2C:
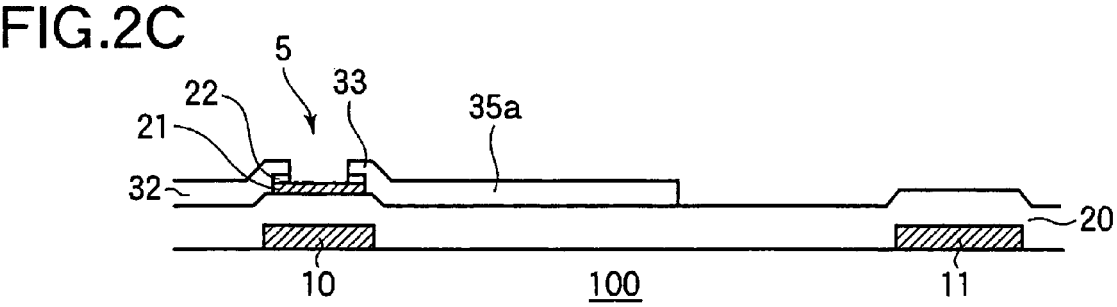
Figure 2D:
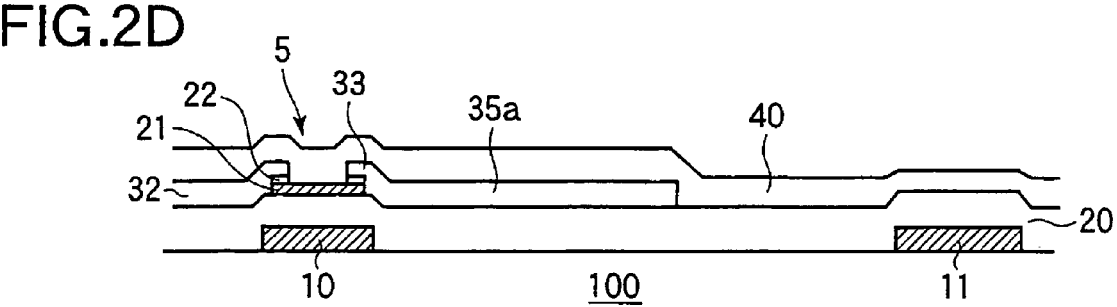

Subsequently, as shown in FIG. 2C, a wiring electrode which is formed of Mo in a film thickness of 20 nm, for example, Al in a film thickness of 200 nm, and Mo in a film thickness of 50 nm is deposited and patterned to form a data bus line 31 (not shown), a drain electrode 32, a source electrode 33, a control electrode 35a, and control electrodes 35b and 35c (not shown). At this time, the impurity layer 22 placed on the channel area of the TFT 5 is removed. Then, as shown in FIG. 2D, a protective insulating film 40 formed of SiN having a film thickness of 400 nm, for example, is deposited over throughout the front surface.

Subsequently, as shown in FIGS. 3A and 3B, a resist mask 7 which patterns the protective insulating film 40 is formed as follows. First, a positive resist is coated over throughout the front surface in a thickness of about 2 μm. Then, the resist is exposed and developed to open in the area in which a contact hole 41 is formed which connects the control electrode 35a to a pixel electrode 51, in the area in which a gate terminal lead part 44 is formed and in the area in which a terminal lead part of the data bus line 31 (not shown) is formed. At this time, the resist is exposed and developed to form the resist mask 7 so that the thickness of the resists in the control capacitance part 42 in which the control electrodes 35a, 35b and 35c and a pixel electrode 52 form control capacitance and in the auxiliary capacitance part 43 in which the auxiliary capacitance bus line 11 and the pixel electrode 51 form auxiliary capacitance is about one-fourth to one-half of the thickness of the resist to remain in the other areas, a film thickness of 0.6 μm, for example. The transmittance of the exposure mask in the areas in which the resist is left thin is formed as 30 to 70%, and thus the resist mask 7 can be formed which has different film thicknesses in predetermined areas.

Subsequently, as shown in FIG. 3A, the resist mask 7 is used to etch the protective insulating film 40 to open the contact hole 41. Although not shown in the drawing, generally at this time, in the terminal lead part outside the display area of the data bus line 31, the protective insulating film 40 is similarly etched and opened. The structure of this terminal lead part is the same as that of the contact hole 41 on the control electrode 35a. As shown in FIG. 3B, at the same time in the process step of opening the contact hole 41, the protective insulating film 40 and the insulating film 20 on a gate terminal 12 which is the terminal lead part of the gate bus line 10 are continuously etched and removed to uncover the terminal.

Figure 4A:
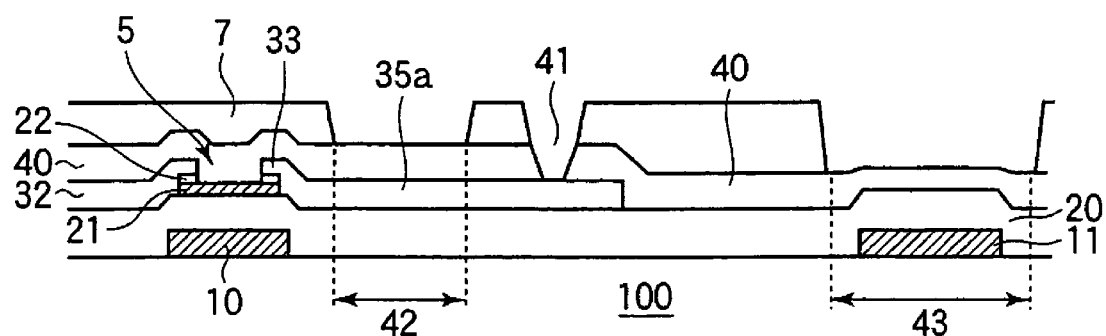
FIGS. 4A and 4B show cross sectional diagrams depicting the fabrication process steps of the TFT substrate for use in the liquid crystal display device according to the first embodiment of the invention.
Figure 4B:
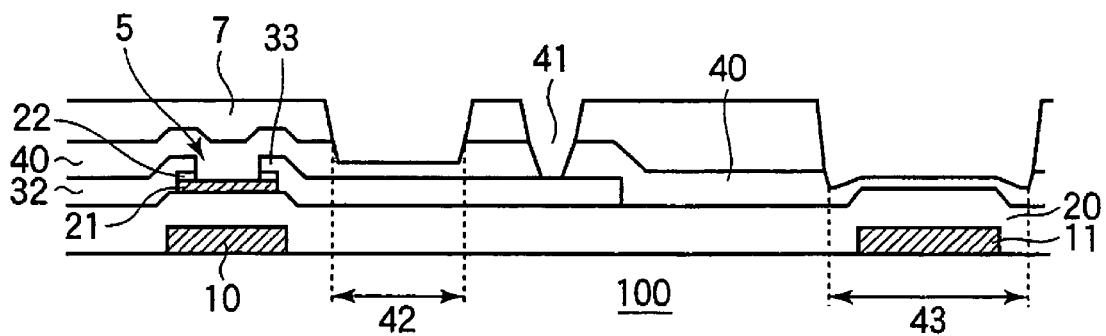

Then, as shown in FIG. 4A, the surface is exposed throughout oxygen plasma to ash the resist mask 7 overall for processing until the resists over the control capacitance part 42 and the auxiliary capacitance part 43 are removed. Subsequently, as shown in FIG. 4B, the protective insulating films 40 in the control capacitance part 42 and the auxiliary capacitance part 43 are again etched to have the remaining film thickness of about 200 nm. Then, the resist mask 7 is all removed.

Subsequently, as shown in FIG. 1B, a transparent electrode formed of ITO having a film thickness of 100 nm, for example, is deposited and patterned to form the pixel electrode 51 in the first area and the pixel electrode 52 in the second area. Then, although not shown in the drawing, an alignment layer formed of polyimide is coated over throughout the front surface. As described above, a TFT substrate 1 is completed.

Although not shown in the drawing, on a counter glass substrate, a light shield mask (black matrix) and a color filter, and a common electrode which is formed of ITO, and other elements are laminated to form the protrusions 61, 62 and 63 in a bank shape. Subsequently, an alignment layer formed of polyimide, for example, is coated over throughout the front surface. As described above, the common substrate is completed. The TFT substrate 1 and the common substrate thus completed are bonded to each other, and liquid crystals are injected and sealed to complete the liquid crystal display device.

Since the pixel electrode 51 is electrically connected to the control electrode 35a extended from the TFT 5 through the contact hole 41, voltage (display signal) is directly written thereto, which drives the liquid crystals from the data bus line 31. On the other hand, since the pixel electrode 52 is capacitively coupled to the control electrodes 35a, 35b and 35c through the protective insulating film 40 in the control capacitance part 42, voltage is written thereto, which is different from the voltage written to the pixel electrode 51. Therefore, the discolor phenomenon can be suppressed when the display screen of the liquid crystal display device is viewed from the oblique direction. In addition to this, the film thickness of the protective insulating film 40 in the control capacitance part 42 is formed as thin as about one-half of the thickness of the protective insulating film 40 for the TFT 5 and the other elements. Thus, even though the control electrodes 35a, 35b and 35c of the liquid crystals display device according to the example are formed to have an area that is about one-half of the area of the control electrodes 35a, 35b and 35c of the liquid crystal display device before, the capacitance values of control capacitance are almost equal in both of the liquid crystal display devices.

In addition, in the auxiliary capacitance part 43, the structure is formed in which the auxiliary capacitance bus line 11 and the pixel electrode 51 sandwich the insulating film 20 and the protective insulating film 40. When the protective insulating film 40 in the auxiliary capacitance part 43 is not formed thin, the thicknesses of the insulating film 20 and the protective insulating film 40 are 400 nm+400 nm=800 nm, whereas in the example, the thicknesses of the insulating film 20 and the protective insulating film 40 are 400 nm+200 nm=600 nm. Therefore, even though the capacitance value of auxiliary capacitance of the liquid crystal display device according to the example is set to the same capacitance value as that of the liquid crystal display device before, the area of the auxiliary capacitance electrode can be reduced to about three quarters. Accordingly, since the aperture ratio of the pixel is increased, the liquid crystal display device is intended to have high brightness.

EXAMPLE 1-2

Next, a liquid crystal display device according to Example 1-2, as an exemplary modification of the embodiment, and a fabrication method of the same will be described with reference to FIGS. 5A to 6C. A plan layout of a TFT substrate 1 of the example is the same as that of the Example 1-1. FIGS. 5A to 6C show cross sectional diagrams depicting the fabrication process steps of the TFT substrate 1 of the example in across section sectioned at a phantom line A-A' shown in FIG. 1A.

Figure 5A:
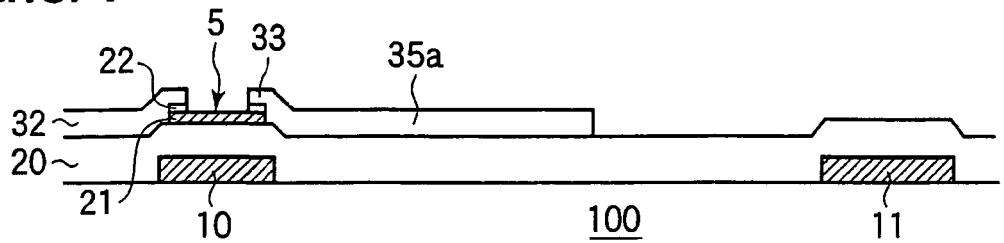
FIGS. 5A to 5D show cross sectional diagrams depicting the fabrication process steps of the TFT substrate for use in the liquid crystal display device according to the first embodiment of the invention.
Figure 5B:
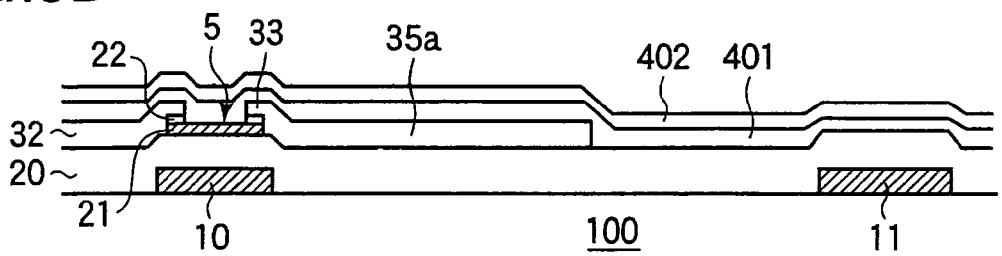

First, as shown in FIG. 5A, by the fabrication process steps as similar to those of the Example 1-1, a gate bus line 10, an auxiliary capacitance bus line 11, an insulating film 20, a data bus line 31 (not shown in FIGS. 5A to 5D), a drain electrode 32, a source electrode 33, and control electrodes 35a, 35b and 35c are formed on a glass substrate 100. Subsequently, as shown in FIG. 5B, an under layer film 401 made of SiN having a film thickness of 150 nm, for example, and an upper layer film 402 made of $SiO_2$ having a film thickness of 300 nm, for example, are deposited in this order, and a protective insulating film 40 which is formed of the under layer film 401 and the upper layer film 402 is deposited over throughout the front surface.

Figure 5C:
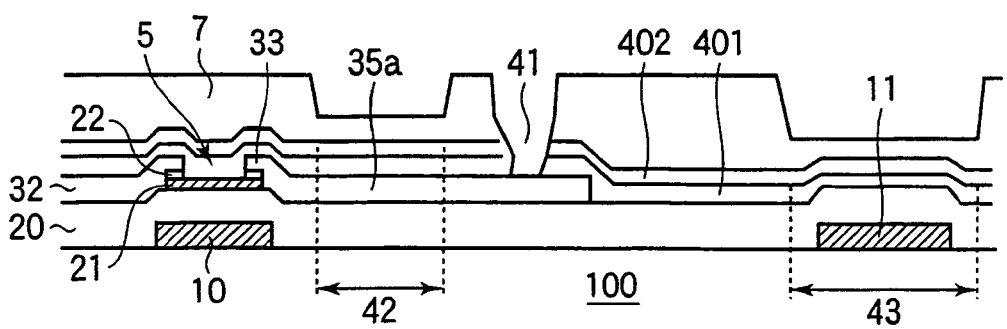

Then, as shown in FIG. 5C, a resist mask 7 is formed which patterns the protective insulating film 40. As similar to the Example 1-1, in the resist mask 7, an opening is formed at the positions at which a contact hole 41, a terminal lead part of the data bus line 31 (not shown) and a gate terminal lead part 44 (see FIG. 5D) are formed. At this time, the resist mask 7 is formed so that the film thickness of the resist in a control capacitance part 42 and an auxiliary capacitance part 43 is about one-forth to one-half of that of the resist to remain in the other areas, a film thickness of 0.6 μm, for example.

Figure 5D:
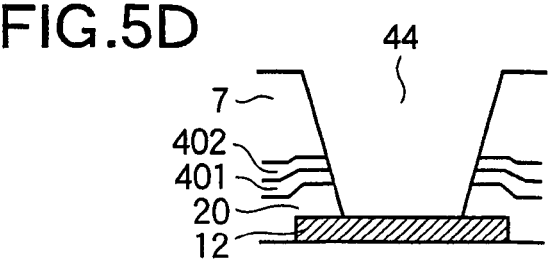

The resist mask 7 is used to continuously etch the upper layer film 402 made of $SiO_2$ and the under layer film 401 made of SiN, and an opening is formed for the contact hole 41 and the terminal lead part of the data bus line 31. As shown in FIG. 5D, in the gate terminal lead part 44, the insulating film 20 is further etched and opened.

Figure 6A:
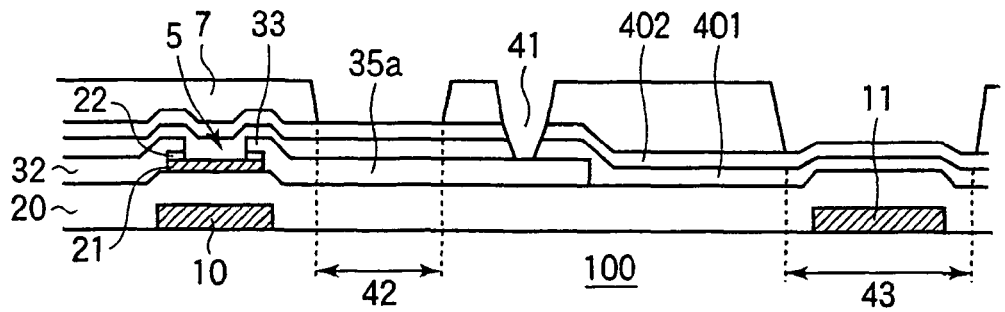
FIGS. 6A to 6C show cross sectional diagrams depicting the fabrication process steps of the TFT substrate for use in the liquid crystal display device according to the first embodiment of the invention.

Subsequently, as shown in FIG. 6A, the surface is exposed throughout to oxygen plasma to ash the resist mask 7 overall for processing until the resists over a control capacitance part 42 and an auxiliary capacitance part 43 are removed.

Figure 6B:
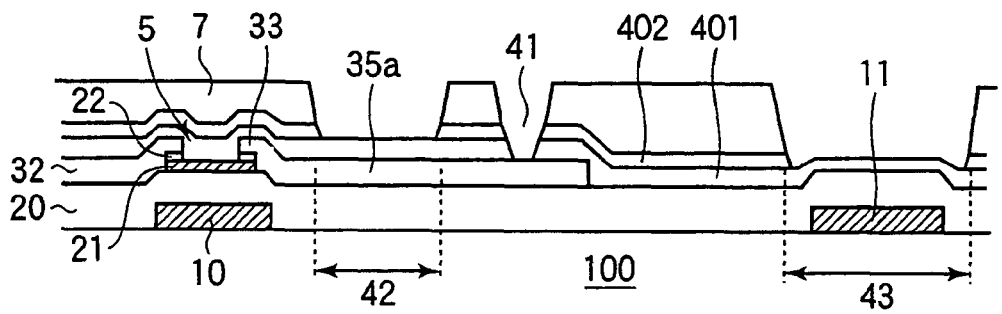
Figure 6C:
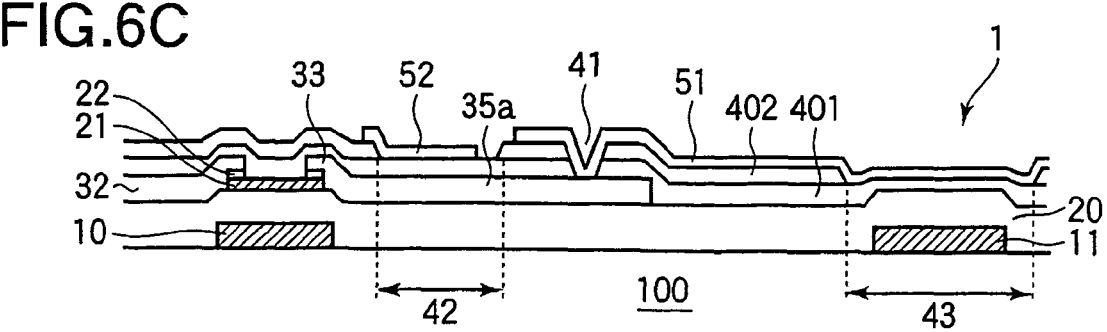

Subsequently, as shown in FIG. 6B, only the upper layer film 402 is again etched in the protective insulating film 40 so that the under layer film 401 remains in the control capacitance part 42 and the auxiliary capacitance part 43. In order to etch the upper layer film 402, for example, when gas such as $CHF_3$ is used for plasma etching, selective etching is possible with respect to the under layer film 401 made of SiN. After that, the resist mask 7 is all removed.

Then, as shown in FIG. 6C, a transparent electrode made of ITO having a film thickness of 100 nm, for example, is deposited and patterned to form a pixel electrode 51 in a first area and a pixel electrode 52 in a second area. Hereinafter, by the fabrication process steps as similar to those of the Example 1-1, the TFT substrate 1 and the liquid crystal display device using the same are completed.

As described above, according to the Example 1-2, the protective insulating film 40 is formed to have a two layer structure. Thus, only the under layer film 401 can be left in the control capacitance part 42, whereas the insulating film having the insulating film 20 and the under layer film 401 laminated can be left in the auxiliary capacitance part 43. In the Example 1-1, the protective insulating film 40 is etched by 200 nm that is about one-half of a film thickness of 400 nm thereof, but in this method, it is necessary to manage the etching rate for control by the etching time period.

In the example 1-2, the upper layer film 402 can be selectively etched with respect to the under layer film 401. Thus, the remaining film thickness of the protective insulating film 40 is determined by the deposited film thickness of the under layer film 401, and the film thickness of the protective insulating film 40 can be controlled easily. In addition, in the protective insulating film 40, it may be possible that the upper layer film 402 is made of SiN and the under layer film is made of $SiO_2$. However, since it is the under layer film that forms control capacitance, the under layer film is made of SiN having a greater relative dielectric constant to reduce the area to be formed in the case in which control capacitance of the same capacitance value is formed in the same film thickness.

In addition, in both of the Example 1-1 and the Example 1-2, either the protective insulating film 40 in the control capacitance part 42 or the protective insulating film 40 in the auxiliary capacitance part 43 may be formed thin. This can be achieved easily only by changing the shape of the resist mask 7. In addition, in the Example 1-1 and the Example 1-2, the pixel structure is described by that using the capacitive coupling HT method, but it is not limited thereto. For example, it can be adapted as well to the case in which only the protective insulating film 40 is formed thin in order to improve the aperture ratio of the pixel in the auxiliary capacitance part 43 in a liquid crystal display device having the pixel structure in which the capacitive coupling HT method is not used.

Second Embodiment

Figure 7A:
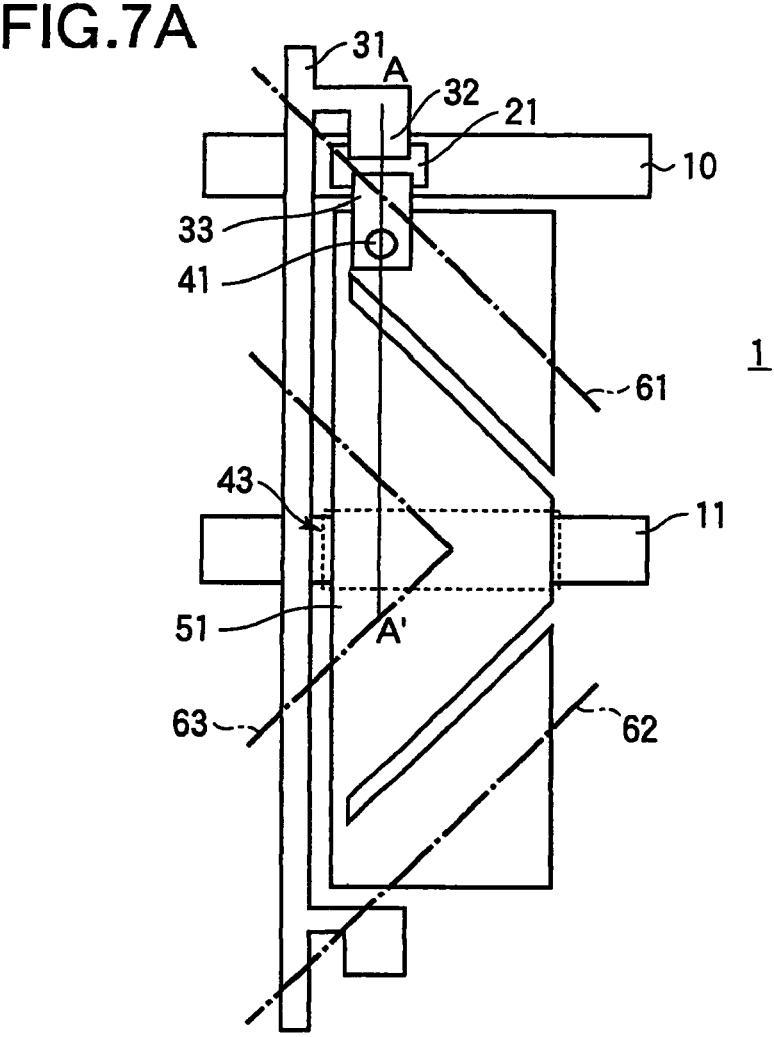
FIGS. 7A and 7B show diagrams depicting the schematic configuration of a single pixel of a TFT substrate for use in a liquid crystal display device according to a second embodiment of the invention.
Figure 7B:
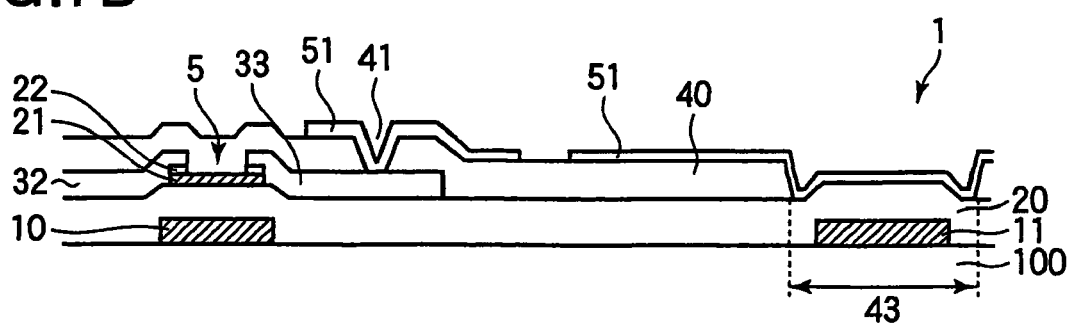

A liquid crystal display device according to a second embodiment of the invention and a fabrication method of the same will be described with reference to FIGS. 7A to 14C. The liquid crystal display device according to the embodiment is characterized in that it has the pixel structure not using the capacitive coupling HT method and the area of auxiliary capacitance is more reduced than that in the conventional liquid crystal display device. First, the principle of the embodiment will be described with reference to FIGS. 7A, 7B and FIGS. 11A to 14C. FIGS. 7A and 7B show the configuration of a single pixel of a TFT substrate 1 for use in an MVA liquid crystal display device according to the embodiment. FIG. 7A shows a plan layout depicting a single pixel of the TFT substrate 1, and FIG. 7B shows the configuration of a cross section sectioned at a phantom line A-A' shown in FIG. 7A. FIGS. 8A to 10B show cross sectional diagrams depicting the fabrication process steps of the TFT substrate 1 shown in FIGS. 7A and 7B. FIGS. 11A to 14C show cross sectional diagrams depicting the fabrication process steps of the TFT substrate for use in liquid crystal display devices of two exemplary modifications according to the embodiment.

In the conventional liquid crystal display device, auxiliary capacitance has the structure in which the auxiliary capacitance bus line and the pixel electrode sandwich the protective insulating film and the insulating film which partially becomes the gate insulating film. However, in the liquid crystal display device according to the embodiment, a protective insulating film which configures auxiliary capacitance is removed to leave only an insulating film, and thus the area to form auxiliary capacitance can be reduced even at the same capacitance value. In addition, in the TFT substrate 1 shown in FIGS. 11A to 12C, for a scheme to leave only an insulating film 20, in a TFT 5 and the other elements, a protective insulating film 40 is formed of a two layer film of $SiO_2$ and SiN from below, for example, (an under layer film 401 and an upper layer film 402), whereas in an auxiliary capacitance part 43, the upper layer film 402 (SiN) and the under layer film 402 ($SiO_2$) are etched in this order. Thus, only the insulating film 20 made of SiN can be left easily.

In the TFT substrate 1 shown in FIGS. 13A to 14C, the film thickness of a resist mask 7 in the area in which a contact hole 41 is formed is formed relatively thin as similar to the auxiliary capacitance part 43, and the resist is removed only in the opening part to uncover the terminals of a gate bus line 10 and an auxiliary capacitance bus line 11. First, the protective insulating film 40 and the insulating film 20 in the opening part to uncover the terminal are etched. Subsequently, the resist having a thin film thickness in the resist mask 7 is removed, and then the contact hole 41 and the protective insulating film 40 in the auxiliary capacitance part 43 are etched. Thus, a source electrode 33 can be uncovered in the contact hole 41, whereas the insulating film 20 can be left in the auxiliary capacitance part 43.

As described above, the structure is formed in which the protective insulating film 40 in the auxiliary capacitance part 43 is thinner than the film thickness thereof in the area which covers the TFT and the other elements or the protective insulating film is removed, and thus the area in the pixel occupied by auxiliary capacitance can be made small even at the same capacitance value. Accordingly, a reduction in the aperture ratio of the pixel can be suppressed at a minimum to obtain bright display as well as a liquid crystal display device excellent in display quality with no image sticking and no flickering. In addition to this, the number of the mask process steps of partially reducing the protective insulating film 40 is not increased, and thus a liquid crystal display device can be fabricated at low cost.

EXAMPLE 2-1

A liquid crystal display device of Example 2-1 according to the embodiment and a fabrication method of the same will be described with reference to FIGS. 7A to 10B. The liquid crystal display device of the Example 2-1 is characterized in that it has the structure in which a protective insulating film 40 in an auxiliary capacitance part 43 is etched and removed and auxiliary capacitance is formed by an auxiliary capacitance bus line 11, a pixel electrode 51 and an insulating film 20 sandwiched therebetween.

An MVA liquid crystal display device not using the capacitive coupling HT method shown in FIGS. 7A and 7B actually has the structure in which vertical alignment liquid crystals are sandwiched and sealed between a TFT substrate 1 and a common substrate (not shown) on which a color filter and the other elements are laminated. For the sake of easy understanding, in FIG. 7A, protrusions 61, 62 and 63 in a bank shape are additionally shown which are formed on the common substrate side and control the alignment of liquid crystal molecules. In the liquid crystal display device, a multi-domain is formed by the protrusions 61, 62 and 63 and a recess that is formed of a space having a slope at an angle of 45 degrees in the pixel electrode 51 on the TFT substrate 1 side. In addition, the liquid crystal display device according to the example may be TN liquid crystals or other liquid crystals.

As shown in FIGS. 7A and 7B, the TFT substrate 1 provided in the liquid crystal display device according to the example has the same pixel structure as that of the liquid crystal display device according to the first embodiment except that it does not have the control electrodes 35a, 35b and 35c and the pixel electrode split into two areas. In addition, since the TFT substrate 1 according to the example does not have the control electrodes 35a, 35b and 35c, control capacitance is not formed in the pixel.

Next, the fabrication method of the liquid crystal display device according to the example will be described with reference to FIGS. 8A to 10B.

Figure 8A:
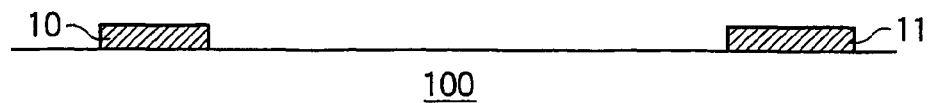
FIGS. 8A to 8D show cross sectional diagrams depicting the fabrication process steps of the TFT substrate for use in the liquid crystal display device according to the second embodiment of the invention.

First, as shown in FIG. 8A, on a glass substrate (first substrate) 100, Al is deposited in a film thickness of 150 nm, for example, and Ti is deposited in a film thickness of 50 nm, for example, in this order, and they are patterned to form a gate bus line 10 and an auxiliary capacitance bus line 11. In a cross section shown in the drawing, the gate bus line 10 functions as a gate electrode, and the auxiliary capacitance bus line 11 functions as an auxiliary capacitance electrode.

Figure 8B:
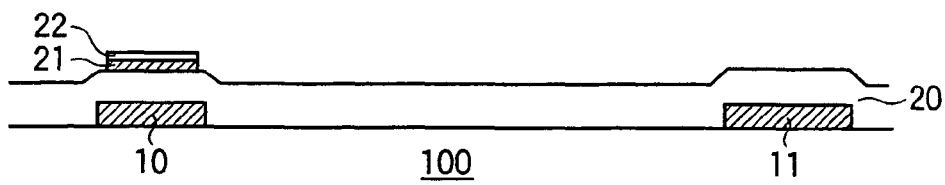

Subsequently, as shown in FIG. 8B, for example, an insulating film 20 made of SiN having a film thickness of 400 nm is formed over throughout the front surface. In a cross section shown in the drawing, the insulating film 20 on the gate bus line 10 functions as a gate insulating film. Then, amorphous silicon is deposited in a film thickness of 70 nm, for example, amorphous silicon doped with phosphorus is deposited in a film thickness of 50 nm, for example, in this order, and they are patterned to form an operative semiconductor layer 21 and an impurity layer 22. The operative semiconductor layer 21 and the impurity layer 22 are left in the area in which a TFT is formed.

Figure 8C:
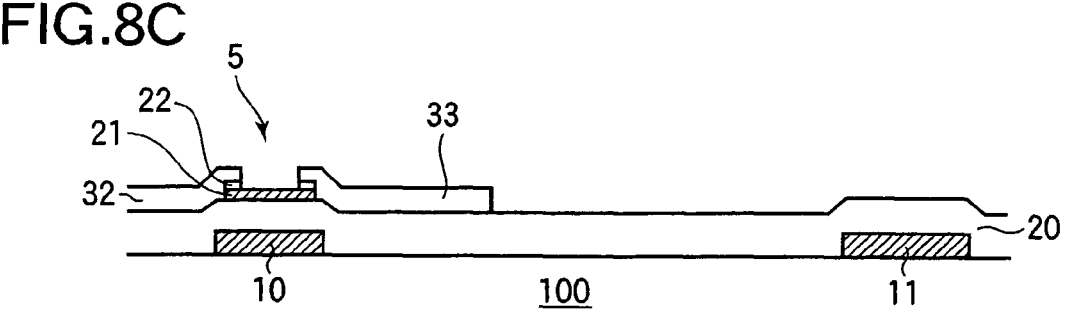
Figure 8D:
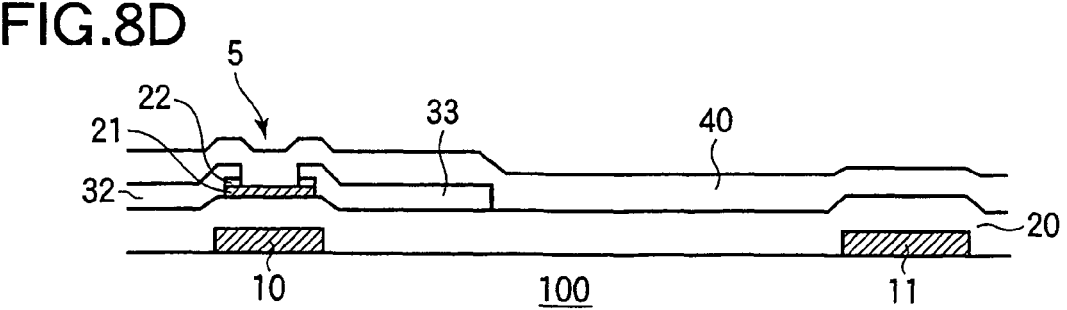

Subsequently, as shown in FIG. 8C, a wiring electrode made of Mo in a film thickness of 20 nm, for example, Al in a film thickness of 200 nm, for example, and Mo in a film thickness of 50 nm, for example, is deposited and patterned to form a data bus line 31, a drain electrode 32, and a source electrode 33. At this time, the impurity layer 22 placed on the channel area of a TFT 5 is removed. Then, as shown in FIG. 8D, a protective insulating film 40 made of $SiO_2$ having a film thickness of 400 nm, for example, is deposited over throughout the front surface.

Subsequently, as shown in FIG. 9A, a resist mask 7 which patterns the protective insulating film 40 is formed as follows. First, a positive resist is coated over throughout the front surface in a thickness of about 2 μm. Then, as similar to the first embodiment, an opening is formed in the resist in the area in which a contact hole 41, the terminal lead part of a data bus line 31 (not shown) and a gate terminal lead part 44 (see FIG. 9B) are formed. At this time, the resist mask 7 is formed so that the thickness of the resist in the auxiliary capacitance part 43 is one-forth to one-half of the thickness of the resist to remain in the other areas, for example, a film thickness of 0.6 μm. In addition, the structure of the terminal lead part of the data bus line 31 is the same as the structure of the contact hole 41 on the source electrode 33.

Then, as shown in FIGS. 9A and 9B, the resist mask 7 is used to etch the protective insulating film 40 to form an opening for the contact hole 41 and the terminal lead part of the data bus line. In the gate terminal lead part 44, the insulating film 20 is further etched and opened.

Figure 10A:
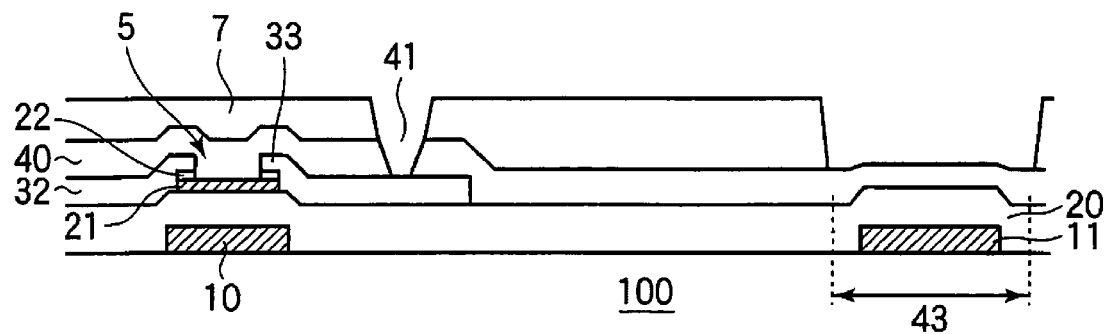
FIGS. 10A and 10B show cross sectional diagrams depicting the fabrication process steps of the TFT substrate for use in the liquid crystals display device according to the second embodiment of the invention.
Figure 10B:
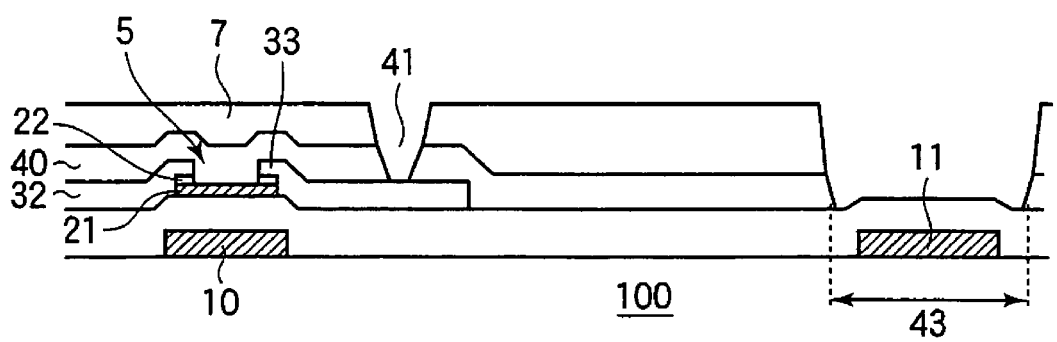

Subsequently, as shown in FIG. 10A, the surface is exposed throughout to oxygen plasma to ash the resist mask 7 overall for processing until the resist in the auxiliary capacitance part 43 is removed. Then, as shown in FIG. 10B, gas such as $CHF_3$ is used to etch the protective insulating film 40 made of $SiO_2$ by plasma etching, and only the insulating film 20 made of a SiN film is left in the auxiliary capacitance part 43. Subsequently, the resist mask 7 is all removed.

Then, as shown in FIG. 7B, a transparent electrode made of ITO having a film thickness of 100 nm, for example, is deposited and patterned to form the pixel electrode 51. Subsequently, although not shown in the drawing, an alignment layer formed of polyimide is coated over throughout the front surface. As described above, the TFT substrate 1 is completed. Hereinafter, the liquid crystal display device is completed by the fabrication process steps as similar to those of the Example 1-1 according to the first embodiment.

As described above, in the example, the structure is configured in which the auxiliary capacitance bus line 11 and the pixel electrode 51 sandwich only the insulating film 20 in the auxiliary capacitance part 43. Therefore, in the liquid crystal display device according to the example, the area to form auxiliary capacitance occupying the pixel can be more reduced than that in the conventional liquid crystal display device in which the protective insulating film 40 is formed in the auxiliary capacitance part 43, when auxiliary capacitance of the same capacitance value is formed. Accordingly, since the aperture ratio of the pixel is increased, a liquid crystal display device of high brightness can be obtained.

EXAMPLE 2-2

Next, a liquid crystal display device of Example 2-2, as an exemplary modification according to the embodiment, and a fabrication method of the same will be described with reference to FIGS. 11A to 12C. A plan layout depicting a TFT substrate 1 of the example is the same as that of the Example 2-1. FIGS. 11A to 12C show cross sectional diagrams depicting the fabrication process steps of the TFT substrate 1 of the example at a cross section sectioned at a phantom line A-A' shown in FIG. 7A.

Figure 11A:
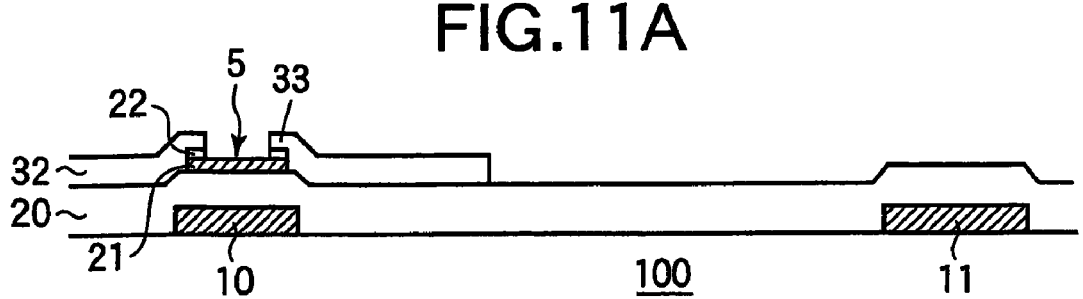
FIGS. 11A to 11D show cross sectional diagrams depicting the fabrication process steps of the TFT substrate for use in the liquid crystal display device according to the second embodiment of the invention.
Figure 11B:
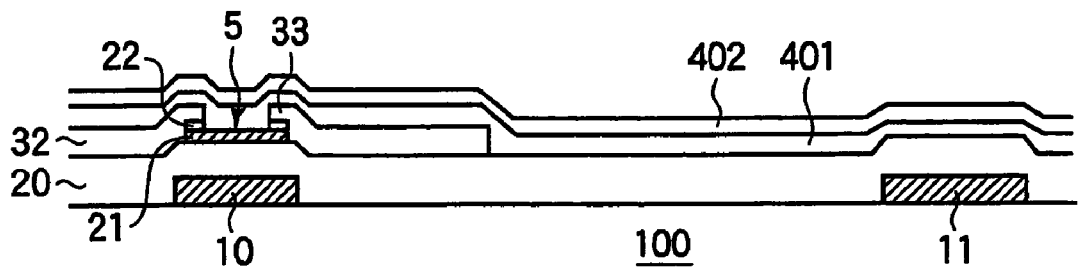

First, as shown in FIG. 11A, by the same fabrication process steps as those of the Example 2-1, a gate bus line 10, an auxiliary capacitance bus line 11, an insulating film 20, a data bus line 31 (not shown in FIGS. 11A to 1D), a drain electrode 32, and a source electrode 33 are formed on a glass substrate 100. Subsequently, as shown in FIG. 11B, an under layer film 401 made of $SiO_2$ having a film thickness of 100 nm, for example, and an upper layer film 402 made of SiN having a film thickness of 300 nm, for example are deposited in this order to deposit a protective insulating film 40 formed of the under layer film 401 and the upper layer film 402 over throughout the front surface.

Figure 11C:
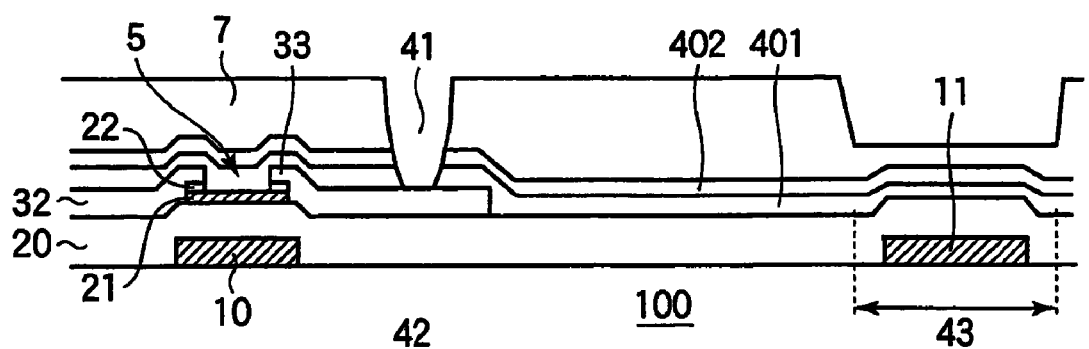
Figure 11D:
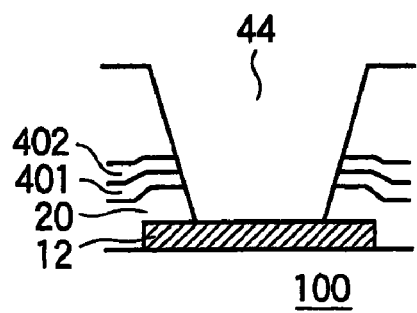

Then, as shown in FIG. 11C, a resist mask 7 is formed which patterns the protective insulating film 40. As similar to the Example 1-1, an opening is formed in the resist mask 7 at the positions at which a contact hole 41, the terminal lead part of the data bus line 31 (not shown) and a gate terminal lead part 44 (see FIG. 1D) are formed. At this time, the resist mask 7 is formed so that the film thickness of the resist in the auxiliary capacitance part 43 is about one-forth to one-half of the film thickness of the resist to remain in the other areas, for example, a film thickness of 0.6 μm.

As shown in FIG. 1C, the resist mask 7 is used to continuously etch the upper layer film 402 made of SiN and the under layer film 401 made of $SiO_2$ to form an opening for the contact hole 41 and the terminal lead part of the data bus line 31. Subsequently, as shown in FIG. 1D, in the gate terminal lead part 44, the insulating film 20 is further etched and opened.

Figure 12A:
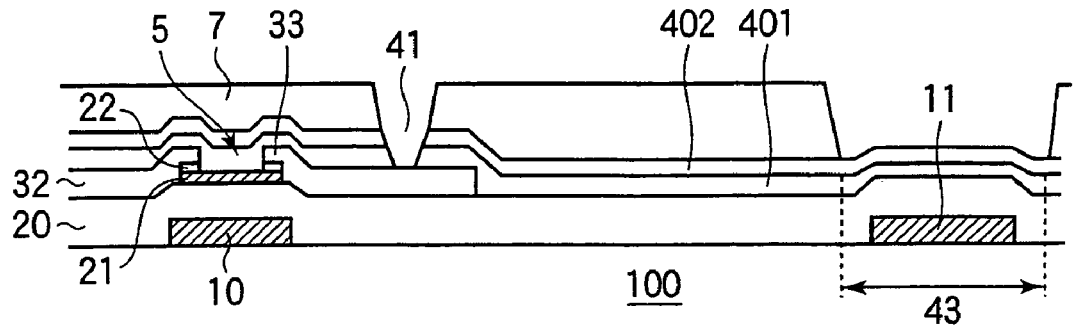
FIGS. 12A to 12C show cross sectional diagrams depicting the fabrication process steps of the TFT substrate for use in the liquid crystal display device according to the second embodiment of the invention.

Then, as shown in FIG. 12A, the surface is exposed throughout to oxygen plasma to ash the resist mask 7 overall for processing until the resist in the auxiliary capacitance part 43 is removed.

Figure 12B:
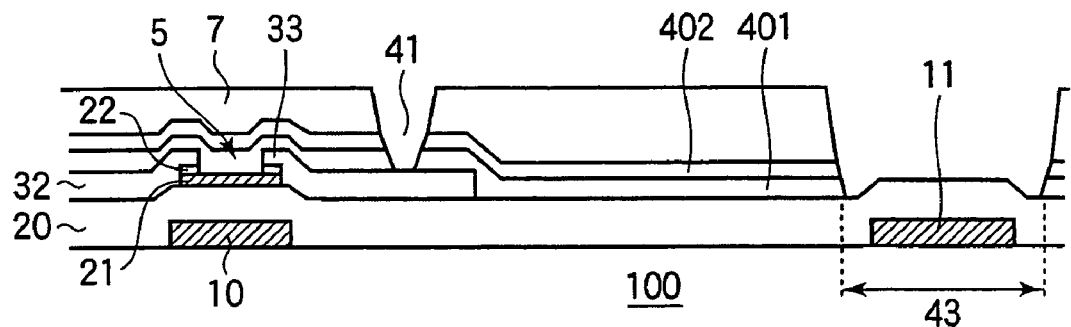

Subsequently, as shown in FIG. 12B, the upper layer film 402 and the under layer film 401 are again continuously etched and removed, and the insulating film 20 made of SiN is left in the auxiliary capacitance part 43. In etching the under layer film 401, when gas such as $CHF_3$ is used for plasma etching, selective etching is possible with respect to the insulating film 20 made of SiN. After that, the resist mask 7 is all removed.

Figure 12C:
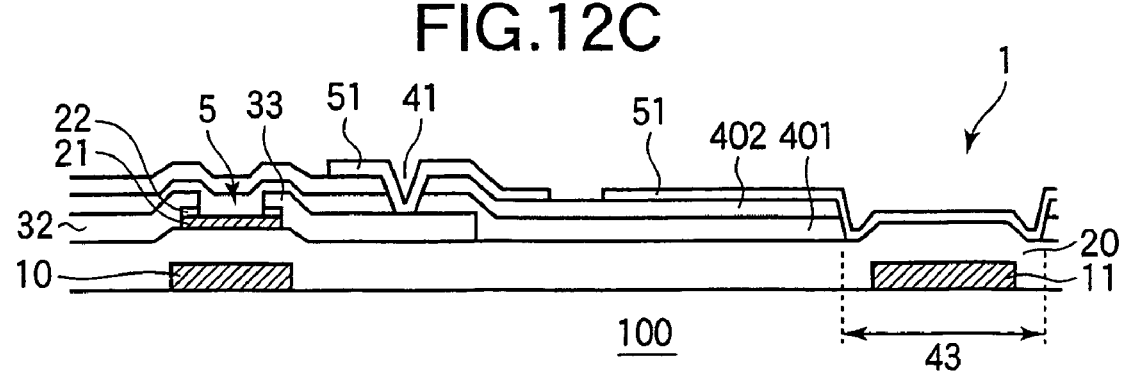

Then, as shown in FIG. 12C, a transparent electrode made of ITO having a film thickness of 100 nm, for example, is deposited and patterned to form a pixel electrode 51. Hereinafter, by the fabrication process steps as similar to those of the Example 1-1, the TFT substrate 1 and the liquid crystal display device using the same are completed.

In the Example 2-1, the protective insulating film 40 is made of only a $SiO_2$ film. However, it is known that SiN has higher ability to block external contamination due to mobile ions such as Na+ than $SiO_2$ does. In the Example 2-2, the protective insulating film 40 for the TFT and the other elements is formed of a laminated film of $SiO_2$ and SiN, and thus it can be etched under excellent control in the auxiliary capacitance part 43 to leave the insulating film 20 made of SiN as well as it sufficiently serves as a protective film. In FIG. 12B, only the upper layer film 402 may be selectively etched to form the composition that the under layer film 401 and the insulating film 20 are remained in the auxiliary capacitance part 43.

EXAMPLE 2-3

Next, a liquid crystal display device of Example 2-3, as another exemplary modification according to the embodiment, and a fabrication method of the same will be described with reference to FIGS. 13A to 14C. A plan layout depicting a TFT substrate 1 of the example is the same as that of the Example 2-1. FIGS. 13A to 14C show cross sectional diagrams depicting the fabrication process steps of the TFT substrate 1 of the example, at a cross section sectioned at a phantom line A-A' shown in FIG. 7A.

Figure 13A:
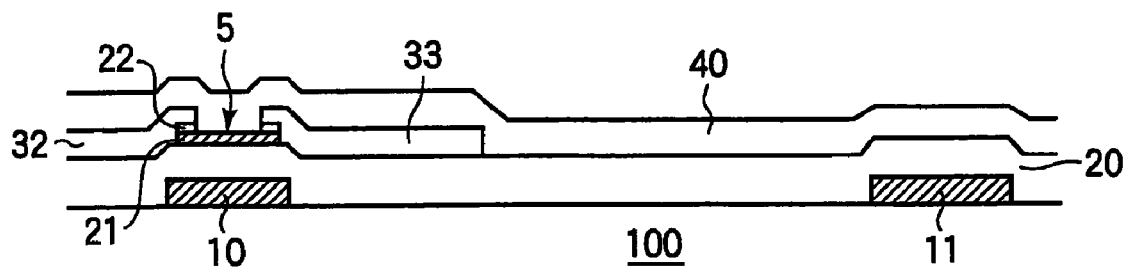
FIGS. 13A to 13D show cross sectional diagrams depicting the fabrication process steps of the TFT substrate for use in the liquid crystal display device according to the second embodiment of the invention.

First, as shown in FIG. 13A, by the fabrication process steps as similar to those of the Example 2-1, a gate bus line 10, an auxiliary capacitance bus line 11, an insulating film 20, a data bus line 31 (not shown in FIGS. 13A to 13D), a drain electrode 32, and a source electrode 33 are formed on a glass substrate 100. Subsequently, as shown in FIG. 13A, a protective insulating film 40 is deposited over throughout the front surface which is made of SiN having high ability to block mobile ions and has a film thickness of 400 nm, for example.

Figure 13B:
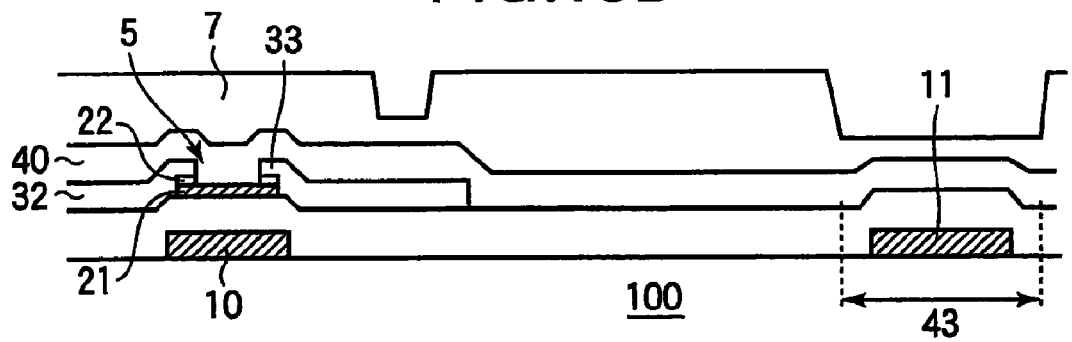
Figure 13C:
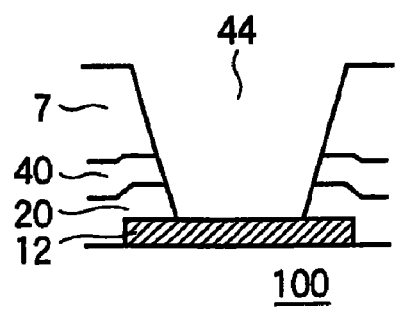

Then, as shown in FIGS. 13B and 13C, a resist mask 7 is formed which patterns the protective insulating film 40. The resist mask 7 of the example is different from that of the first embodiment and the Examples 2-1 and 2-2 according to this embodiment in that an opening is formed only in the area in which a gate terminal lead part 44 is formed, and it is formed to have the film thickness that is about one-forth to one-half of that of the resist to remain in the other areas, for example, a film thickness of 0.6 μm in a contact hole 41, the terminal lead part of the data bus line 31 (not shown) and an auxiliary capacitance part 43. As shown in FIG. 13C, the resist mask 7 is used to continuously etch the protective insulating film 40 and the insulating film 20 to form an opening for the gate terminal lead part 44.

Figure 13D:
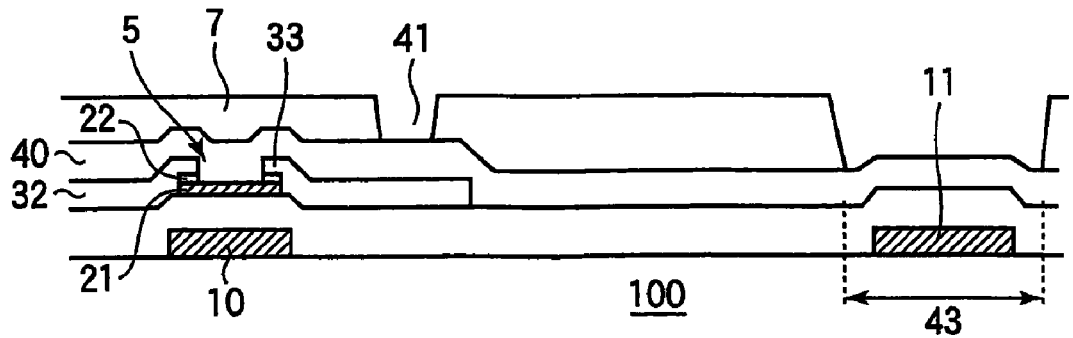

Subsequently, as shown in FIG. 13D, the surface is exposed throughout to oxygen plasma to ash the resist mask 7 overall for processing until the resist in the contact hole 41, the terminal lead part of the data bus line and the auxiliary capacitance part 43 is removed.

Figure 14A:
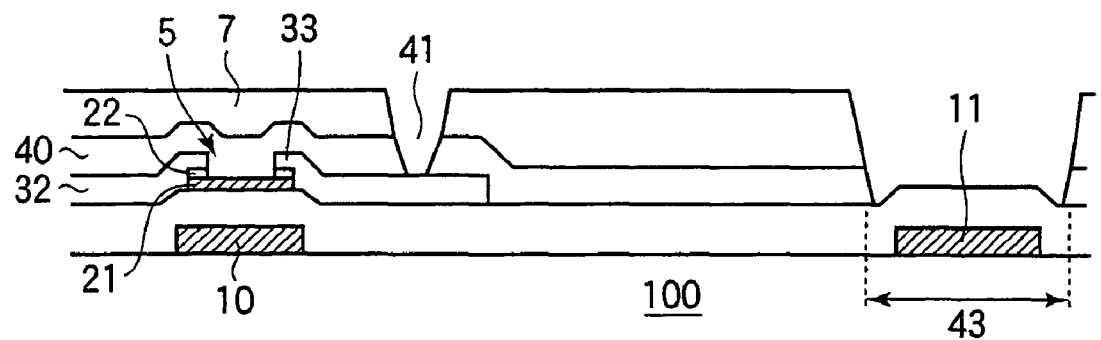
FIGS. 14A to 14C show cross sectional diagrams depicting the fabrication process steps of the TFT substrate for use in the liquid crystal display device according to the second embodiment of the invention.

Then, as shown in FIG. 14A, the protective insulating film 40 is again etched by plasma etching, the contact hole 41 and the terminal lead part of the data bus line 31 are opened, and the protective insulating film 40 is also etched in the auxiliary capacitance part 43. At this time, both of the protective insulating film 40 and the insulating film 20 are made of SiN, but the time to finish etching the contact hole 41 and the terminal lead part of the data bus line 31 can be sufficiently detected by a general plasma monitor. Therefore, etching is finished in association with the time to finish this etching, and thus it can be controlled easily that the insulating film 20 in the auxiliary capacitance part 43 is left in a predetermined film thickness. After that, the resist mask 7 is all removed.

Figure 14B:
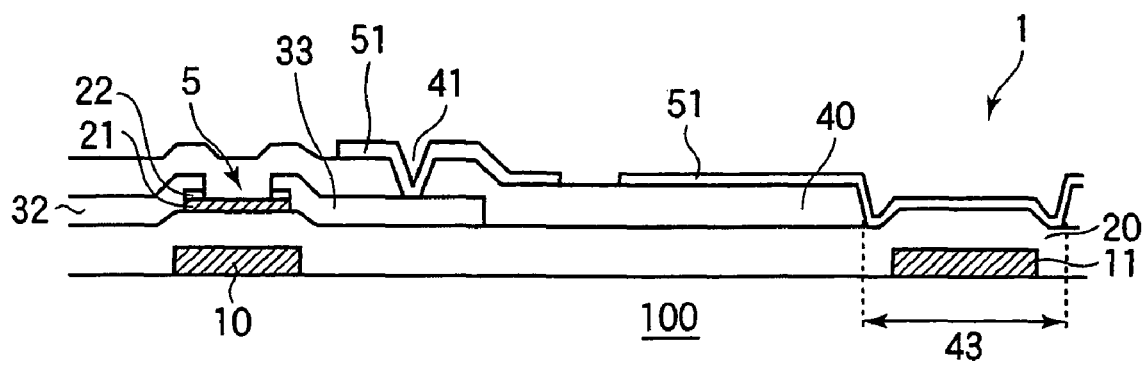

Subsequently, as shown in FIG. 14B, a transparent electrode made of ITO having a film thickness of 100 nm, for example, is deposited and patterned to form a pixel electrode 51. Hereinafter, by the fabrication process steps as similar to those of the example 1-1, the TFT substrate 1 and the liquid crystal display device using the same are completed.

As described above, in the example, the protective insulating film 40 is made of only SiN. However, etching is finished at the same time when etching the contact hole 41 and the terminal lead part of the data bus line 31 is finished, and thus it can be detected at the time when etching the protective insulating film 40 in the auxiliary capacitance part 43 is finished. Therefore, the insulating film 20 (SiN film) in the auxiliary capacitance part 43 can be left easily.

In addition, when the areas to form an opening for the contact hole 41 and the terminal lead part of the data bus line are small and it is difficult to detect the time to finish etching, this scheme is done to allow detecting the time to finish etching in which dummy source and drain electrodes and a contact hole are provided in a protective insulating film thereon at the places which cause no trouble to the liquid crystal display device inside the surface of a glass substrate 100 and that contact hole tells the time to finish etching a protective insulating film 40.

Figure 14C:
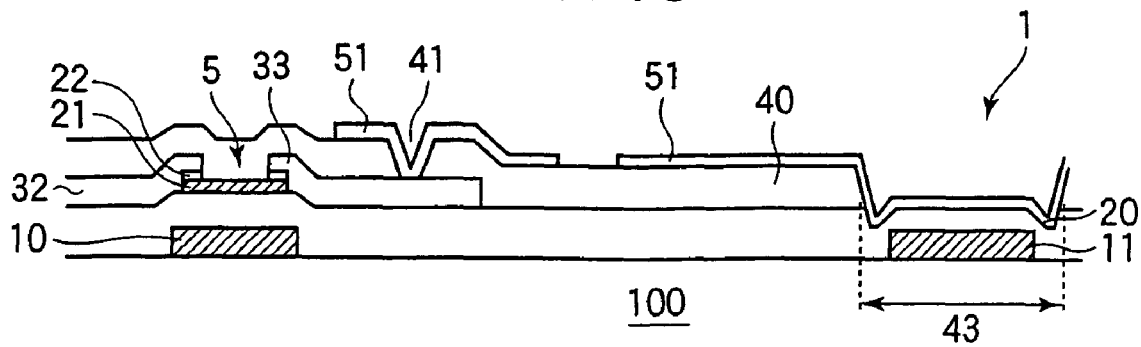
Figure 15A:
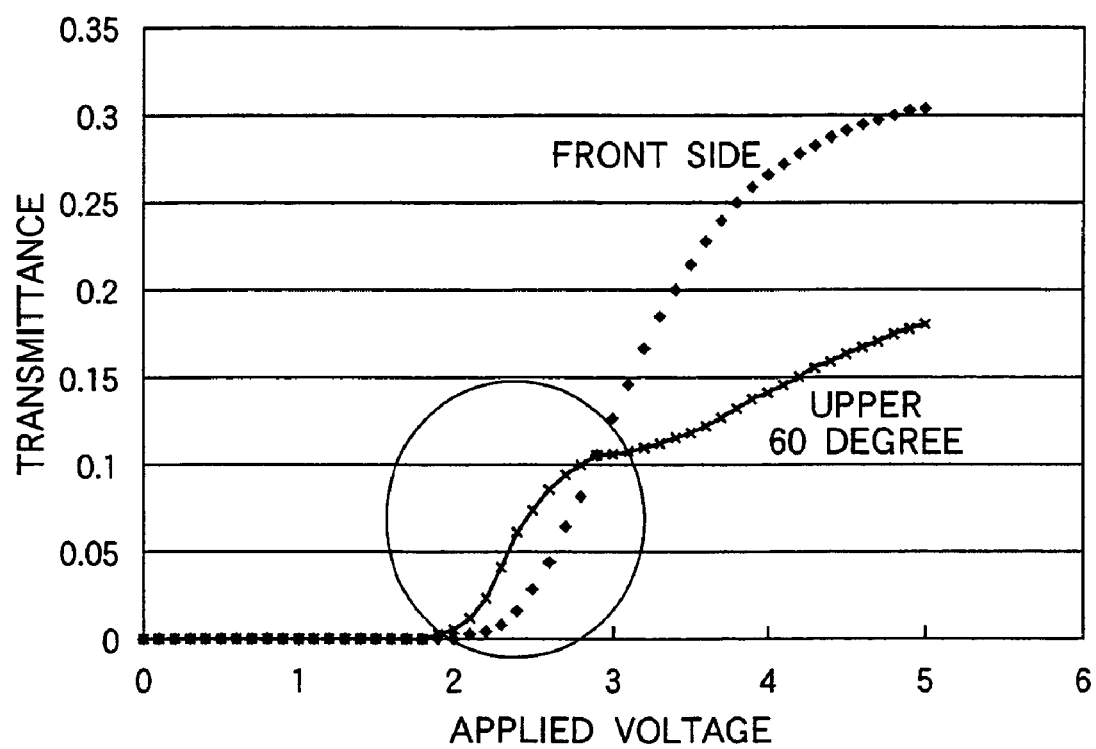
FIG. 15A shows a graph depicting the T-V property of a conventional liquid crystal display device.
Figure 16A:
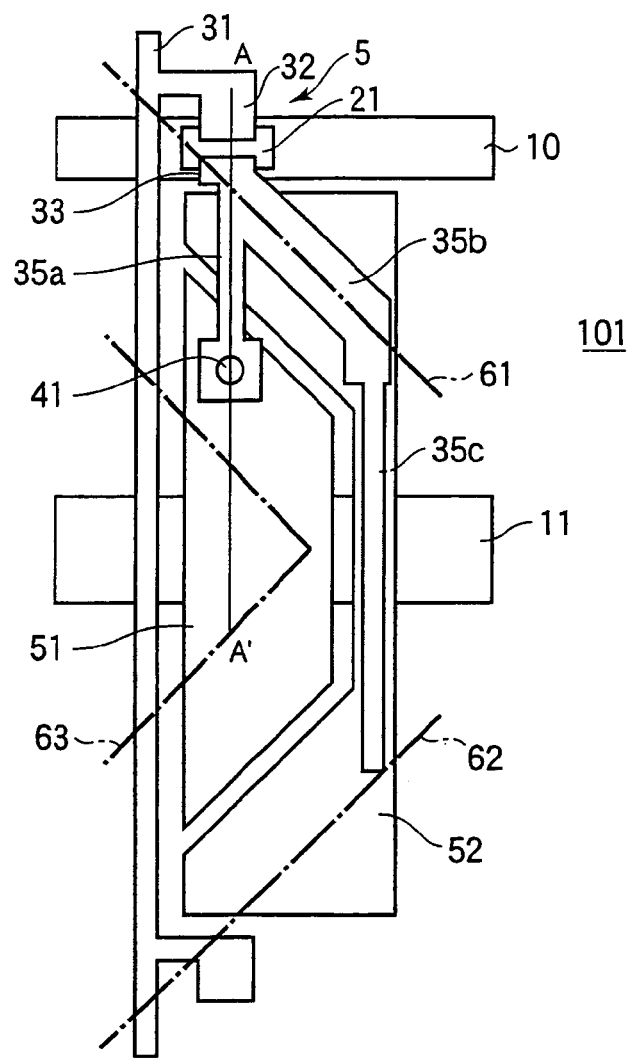
FIGS. 16A and 16B show diagrams depicting the schematic configuration of a single pixel of the TFT substrate for use in the conventional liquid crystal display device before.
Figure 16B:
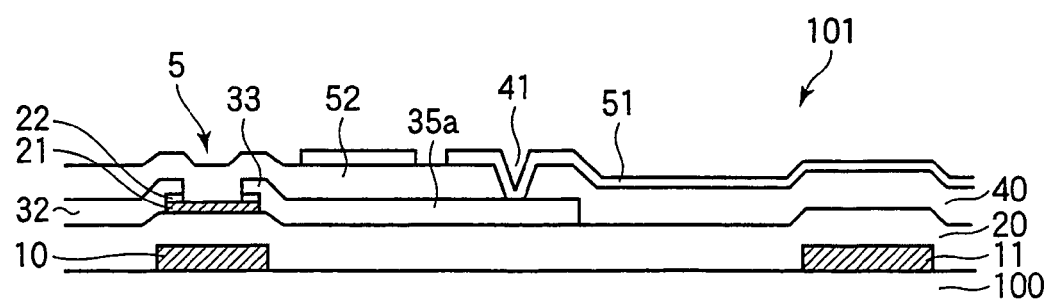

As described above, since the time to finish etching the protective insulating film 40 can be monitored, this scheme may be done in which after finishing etching the protective insulating film 40, the insulating film 20 in the auxiliary capacitance part 43 is further etched to reduce the film thickness to about one-third of the total film thickness, for example, and the film thickness of the insulating film 20 in the auxiliary capacitance part 43 is further reduced to increase a capacitance value per unit area. In this case, the remaining film thickness is to be controlled by the etching time, but it is sufficient when the etching rate is controlled. A cross section depicting the TFT substrate 1 thus fabricated is shown in FIG. 14C. In addition, it is apparent that the fabrication method described in FIGS. 13A to 14C can be adapted to the two layer structure as the protective insulating film 40 in the Example 2-2.

As described above, according to the first embodiment, the structure is configured in which the protective insulating film 40 in the control capacitance part 42 or the protective insulating film 40 in the auxiliary capacitance part 43 is formed relatively thin, the areas of the metal electrodes to form the capacitance (the control electrodes 35a, 35b and 35c, the auxiliary capacitance bus line 11, etc.) can be reduced. Accordingly, a reduction in the aperture ratio of the pixel can be suppressed at a minimum to obtain bright display as well as an MVA liquid crystal display device by the capacitive coupling HT method which has excellent display quality and a viewing angle property with no discolor, no image sticking, and no flickering.

In addition, according to the second embodiment, the structure is configured in which the protective insulating film 40 in the auxiliary capacitance part 43 is formed relatively thin or is removed, and thus the area of the metal electrode to form the capacitance (auxiliary capacitance bus line 11) can be reduced. Accordingly, a reduction in the aperture ratio of the pixel can be suppressed at a minimum to obtain bright display as well as a liquid crystal display device which has excellent display quality with no image sticking, and no flickering.

Furthermore, according to the first and the second embodiments, the TFT substrate 1 can be fabricated without increasing the number of the mask process steps of partially reducing the protective insulating film 40, and thus a liquid crystal display device can be fabricated at low cost.

What is claimed is:

1. A liquid crystal display device comprising:
   first and second substrates which are disposed as they face each other;
   liquid crystals which are sealed between the first and the second substrates;
   a plurality of gate bus lines which are disposed on the first substrate and to which a scanning signal is supplied;
   a plurality of auxiliary capacitance electrodes which are formed at the same time as the gate bus lines;
   an insulating film which is formed above the gate bus lines and the auxiliary capacitance electrodes and part of which functions as a gate insulating film;
   a plurality of data bus lines which are disposed on the first substrate and intersect with the gate bus lines and to which a display signal is supplied;
   a switching device which is formed for each pixel area, the pixel areas being substantially defined by the gate bus lines and the data bus lines;
   a pixel electrode which is electrically connected to the switching device;
   a protective insulating film which is disposed below the pixel electrode and which substantially covers the gate bus lines, the data bus lines and the switching devices;
   an auxiliary capacitance which is formed between the pixel electrode and the auxiliary capacitance electrode,
   wherein at least part of the protective insulating film above the auxiliary capacitance electrode is removed so as to form an aperture,
   the insulating film which is sandwiched between the auxiliary capacitance electrode and the pixel electrode helping form the auxiliary capacitance,
   the insulating film which helps form the auxiliary capacitance is formed to have a film thickness the same as that of the insulating film in the switching device or thinner, and wherein the pixel electrode is directly formed on the insulating film in an area where the auxiliary capacitance is formed; and
   wherein a surface of the pixel electrode on the insulating film in the area where the auxiliary capacitance is formed is uneven so that the pixel electrode extends further into the insulating film than a surface of the insulating film on both sides of the area where the auxiliary capacitance is formed, but not through the insulating film, at an area proximate an edge of the auxiliary capacitance electrode than at an area over a central portion of the auxiliary capacitance electrode.

2. The liquid crystal display device according to claim 1, wherein the protective insulating film which covers the gate bus lines, the data bus lines and the switching devices is formed of at least first and second layers from below.

3. The liquid crystal display device of claim 1, wherein the insulating film is thinner above a top flat surface of the auxiliary capacitance electrode in the auxiliary capacitance region than above a top flat surface of a gate electrode of the switching device.

* * * * *